Nov. 13, 1934.  P. COVICH  1,980,255
TIP-UP FOR FISHING THROUGH ICE
Filed March 15, 1934
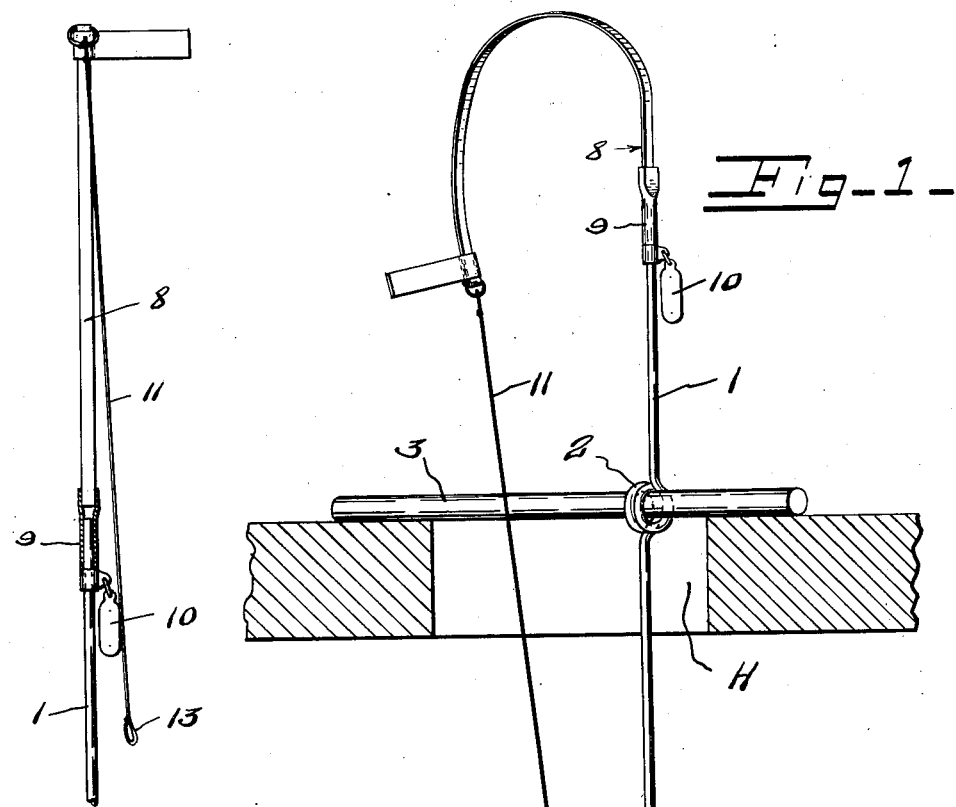
Fig-1-
Fig-2-
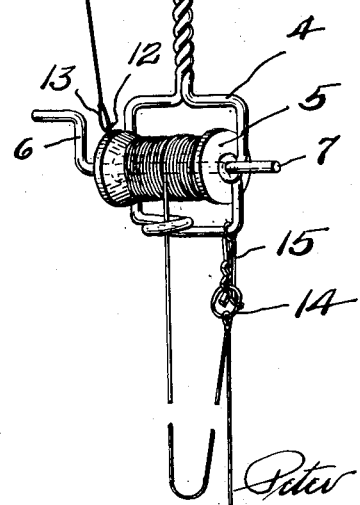
INVENTOR.
Peter Covich
BY
ATTORNEYS.

Patented Nov. 13, 1934

1,980,255

UNITED STATES PATENT OFFICE 1,980,255

TIP-UP FOR FISHING THROUGH ICE

Peter Covich, Syracuse, N. Y.

Application March 15, 1934, Serial No. 715,685

1 Claim. (Cl. 43—16)

This invention relates to so-called tip-up devices for fishing through holes in the ice of rivers, lakes or other bodies of water, and has for its object a tip-up device which consists of a straight or upright body supporting a reel on which the fish line is wound below the surface of the ice to prevent freezing of the line and a signal at the upper end of the body above the ice to indicate that a fish is caught, which signal is not releasable or operable by outside influences as the wind, etc.

It further has for its object a tip-up having a body so arranged that it projects high and above the ice so as not to be covered by snow unless there is an extremely abnormal amount of snow, and which can not be knocked down by the wind and storms, but on the other hand will remain upright and effective.

It further has for its object a tip-up having a signal which is operated when the fish is caught by the unwinding of the line from the reel, or a tip-up not dependent upon the tilting of something under a weight or lack of weight and in which any tilting can in no way affect the signal.

Other objects appear throughout the specification.

The invention consists in the novel features and in the combinations and constructions hereinafter set forth and claimed.

In describing this invention, reference is had to the accompanying drawing in which like characters designate corresponding parts in all the views.

Figure 1 is a perspective view of this tip-up, the ice on the surface of the water being designated in section.

Figure 2 is a detail fragmentary view of the signal and contiguous parts.

1 designates the body which is arranged when in use in upright or vertical position to depend through the hole H in the ice and also to project a considerable distance above the surface of the ice. Preferably, the body is formed of wire and with means as an eye 2 intermediate its ends for receiving a stick or other support 3 by means of which the signal is supported from the surface of the ice through the hole in the ice, so that the stick will bridge the hole H in the ice. The body is also provided at its lower end with a frame 4 in which is rotatably mounted a spool 5 which is operable to wind the line on the reel by means of a handle or crank 6. The handle or crank is formed with an axle 7 for the spool or reel 5 and fits into the central opening with a friction fit sufficient to effect the winding of the reel by the crank when the line is being wound thereon but not sufficient to prevent unwinding of the line in case the handle becomes obstructed.

8 designates the signal supported at the upper end of the body or wire 1, this being a flexible resilient tip arranged to be set in a flexed, retracted, or bent-over position, as shown in Figure 1, and to spring or react into straight upright position, as shown in Figure 2, when released by the pull of the fish on the line. As here shown, the signal 8 is formed with a slip socket 9 fitting over the tip or the end of the body 1, the body 1 being also provided with a suitable identifying tag 10. The signal is held in its retracted or bent-over position by connections between it and the reel, which connections are releasable by the unwinding action of the reel under the pull of the fish so that when the connections are released from the reel, the resilient signal is free to react or spring into straight position.

These connections, as here shown, include a cord or wire 11 fixed at one end to the tip of the signal and detachably coupled at its other end to the reel by a coupling which acts to uncouple upon unwinding of the reel. The coupling here shown includes a hook 12 on the reel with the bill thereof extending in a direction opposite to the direction of rotation of the reel when unwinding and a loop or eye 13 at the lower end of the wire or cord engaged with the hook 12. Obviously, when a fish is caught, the unwinding action of the reel will disengage the loop or eye from the hook so that the signal is free to react. Sometimes, as at night, the signal is not used, that is, the wire 11 is not hooked over the hook 12 on the reel, and then in fishing through the ice, the fisherman locates a ring 14 on the line at a proper place for the depth of the water, and this ring is caught in a friction catch 15 of any suitable construction on the frame 4, the friction catch 15 being here shown as a spring U-shaped clip between the branches of which the ring is inserted, one or both of the branches may be formed with corrugations for creating sufficient friction. When a fish takes the hook at the end of the line and swims away, the ring 14 is dislodged. At other times, as when the lines are being watched, the signal is set in order to notify the attendant instantly when a fish is caught, then the ring 14 is not used as the wire hooked on the hook 12 holds the line and sinker thereon to the desired depth in the water.

This tip-up can be suspended in the water through the hole in the ice with the reel under water, so that the line wound on the reel will not freeze, and also, the body will project far enough above the ice so as to be visible for a long distance and indicate the location of the tip-up and whether or not a fish is caught and also, it will project far enough above the ice so as not to be covered during an ordinary snow storm. Furthermore, tilting or swinging under the influence of wind will not tip the device, so that it will remain tipped and also will not dislodge the wire or cord 11 from the reel and the only force that will uncouple the wire from the reel is the turning of the reel under the pull of the fish.

A tip-up of this construction is extremely simple and economical in construction, easy to carry from place to place in quantities, is readily set up through the holes in the ice, and its operation is not affected by snow storms and wind.

What I claim is:

A tip-up device for fishing through the ice comprising a comparatively straight sticklike upright body having means between its ends for receiving a support for pivotally supporting the body in upright position through the hole in the ice from the surface of the ice, a fish line reel carried by the lower end of the body, a flexible resilient signal carried at the upper end of the body and secured thereto, and a cord or wire connecting the signal and the reel for holding the signal in flexed position, and a coupling between said cord or wire and the reel and operable to uncouple upon unwinding of the reel, thereby releasing the signal.

PETER COVICH.